US006902415B2

(12) United States Patent
Ramsey et al.

(10) Patent No.: US 6,902,415 B2
(45) Date of Patent: Jun. 7, 2005

(54) FOUR-WAY ELECTRICAL CIRCUIT SPLITTER FOR USE WITH MODULAR ELECTRICAL SYSTEMS

(75) Inventors: Mark E. Ramsey, Fort Wayne, IN (US); Raymond H. Riner, Hicksville, OH (US); Brian K. Rupert, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 0 days.

(21) Appl. No.: 10/688,715

(22) Filed: Oct. 17, 2003

(65) Prior Publication Data

US 2005/0101171 A1    May 12, 2005

Related U.S. Application Data

(60) Provisional application No. 60/419,343, filed on Oct. 18, 2002.

(51) Int. Cl.[7] ............................................. H01R 4/60
(52) U.S. Cl. ...................... 439/215; 439/535; 439/654; D13/139.8; 174/48
(58) Field of Search ................................ 439/535, 215, 439/654, 638; D13/139.8; 174/48

(56) References Cited

U.S. PATENT DOCUMENTS

| 3,659,247 | A | | 4/1972 | Chaney et al. ............ 339/21 R |
| 4,362,905 | A | | 12/1982 | Ismail ...................... 179/1 PC |
| 4,875,871 | A | | 10/1989 | Booty, Sr. et al. .......... 439/209 |
| 5,096,433 | A | | 3/1992 | Boundy ...................... 439/215 |
| 5,559,681 | A | | 9/1996 | Duarte ....................... 362/252 |
| 5,562,469 | A | | 10/1996 | Nienhuis et al. ............. 439/275 |
| 5,679,023 | A | | 10/1997 | Anderson, Jr. et al. ...... 439/502 |
| 6,227,903 | B1 | | 5/2001 | Horton ....................... 439/535 |
| 6,406,314 | B1 | * | 6/2002 | Byrne ......................... 439/215 |
| 6,416,339 | B1 | * | 7/2002 | Snow et al. ................. 439/215 |
| 2002/0052133 | A1 | | 5/2002 | Henriott et al. ............ 439/215 |

* cited by examiner

Primary Examiner—Tho D. Ta
(74) Attorney, Agent, or Firm—Taylor & Aust, P.C.

(57) ABSTRACT

A modular wall panel assembly including a modular wall panel and a wiring harness connected to the modular wall panel. The wiring harness has a plurality of conductors. An electrical connector is connected to the wiring harness. The electrical connector has a plurality of terminal ports and a transverse axis, two pairs of opposed terminal ports facing opposite directions from the transverse axis, each pair has one terminal port positioned further away from the transverse axis and another terminal port positioned closer to the transverse axis.

16 Claims, 3 Drawing Sheets

FOUR-WAY ELECTRICAL CIRCUIT SPLITTER FOR USE WITH MODULAR ELECTRICAL SYSTEMS

CROSS REFERENCE TO RELATED APPLICATIONS

This is a non-provisional application based upon U.S. provisional patent application Ser. No. 60/419,343, entitled "FOUR-WAY ELECTRICAL CIRCUIT SPLITTER FOR USE WITH MODULAR ELECTRICAL SYSTEMS", filed Oct. 18, 2002.

BACKGROUND OF THE INVENTION

1. Field of the Invention

The present invention relates to modular electrical systems, and, more particularly, to a four-way electrical circuit splitter for use with modular electrical systems.

2. Description of the Related Art

Wall panel systems are used extensively in commercial and industrial settings to define workspace, provide privacy, control traffic flow, and minimize noise. Wall panel systems can also provide suitable structures for use with desks, tables, shelves, trays and the like as well as with other furniture, components, equipment and material such as may be used in a commercial or industrial setting. In addition, wall panel systems can be advantageously integrated into the design and decoration of a commercial or industrial setting.

Wall panel systems may be comprised of individual wall panel units of various types and sizes. Wall panel units may be full height floor-to-ceiling walls or may be walls of less than floor-to ceiling height, or may be comprised of a combination of such walls of varying heights. Wall panel units may totally enclose or only partially enclose specific areas depending upon the particular needs of the site. An advantage of wall panel systems of this type is that they can be reconfigured relatively easily compared to permanent wall structures (such as studs and drywall, plaster, or concrete).

In using wall panel systems, it is essential to provide electricity to workstations located in and around the wall panel units. Present demands for electrical power consumption may require the provision of several circuits through a wall panel system. Present demands may even require the use of one or more isolated circuits that do not share a neutral or ground wire with other circuits in order to minimize electrical interference that might cause problems for computer or communication systems. Accordingly, it is desirable that an electric distribution system be provided with the wall panel system that is easy to install yet provides a high level of electrical service.

Related to the feature of ease of installation is reconfigurability. Wall panel systems may be preferred over permanent wall structures because of the relative ease with which such systems can be reconfigured to adapt to the needs of a changing or expanding business. In particular, where a wall panel system is of high quality and durable, it is possible that at some point during the use of the wall panel system, the user's need will change and a reconfiguration of the wall panel system will be desired. In such a case, it would be advantageous to have an electrical distribution system that can also be easily reconnected and reconfigured at the user's site either in the event of a reconfiguration of the wall panel system or in order to provide a different level of electric service to an existing wall panel system.

Different types of electrical distribution systems are provided for use with wall panel units. One wall panel system that includes an electrical distribution system that provides electrical receptacles at the lower bottom corners of the wall panels, these lower receptacles not always conveniently located. Power receptacles may not be available as electrical and electronic devices are added, simply due to all available existing receptacles being used.

A modular wall panel can have a variety of distribution harnesses and jumper cables terminating in connectors that allow interconnection of the harnesses and jumper cables. Such connectors connect into a single harness or jumper cable thereby limiting expansion of the system since there is no connector available to tap into the system. Further, expansion of the number of receptacles is typically limited or not available due to all available connectors being used. Duplex receptacles typically can be accessed through a cutout in the modular wall panel.

A quad connector is known that includes two surfaces with one surface which has a pair of female sockets terminating in the same plane and the other surface which has a pair of male sockets terminating in the same plane. One problem with this connector is that, with the pair of sockets on a given side terminating in the same plane, interferences can be created when two connectors are mated with the quad pair. Another problem with the known quad connector is that there is no attachment device for attaching to existing structure, such as the frame of a modular wall panel. Without an attachment device anchoring the connector to fixed structure, reconfiguring an electrical system by, for example, adding another cable to the connector can disrupt existing connections and therefore cause disconnection in power not intended. Another problem with this design is that it allows reversed mounting of duplex receptacles.

What is needed in the art is a circuit splitter with a plurality of connector pairs, the two connectors associated with a given connector pair offset, the splitter easily attachable to an existing structure while maintaining the proper orientation of duplex receptacles attached thereto.

SUMMARY OF THE INVENTION

The present invention provides a circuit splitter with a plurality of connector pairs, the two connectors associated with a given connector pair offset, and the splitter easily attachable to an existing structure.

The invention comprises, in one form thereof, a modular wall panel assembly including a modular wall panel and a wiring harness connected to the modular wall panel. The wiring harness has a plurality of conductors. An electrical connector is connected to the wiring harness. The electrical connector has a plurality of terminal ports and a transverse axis, two pairs of opposed terminal ports facing opposite directions from the transverse axis, each pair has one terminal port positioned further away from the transverse axis and another terminal port positioned closer to the transverse axis.

An advantage of the present invention is that when it is used to interconnect modular electrical devices such as jumper cables, distribution harness and boxes, and electrical receptacles, additional connector ports are available for system expansion and reconfiguration.

Another advantage of the present invention is that it provides a plurality of connector pairs, the two connectors associated with a given connector pair offset thereby avoiding physical interference issues.

Yet another advantage is the present invention is easily attachable to an existing structure.

A further advantage of the present invention is that it maintains the proper orientation of duplex receptacles attached thereto.

A further advantage of the present invention is a four-way electrical circuit splitter connector embodiment of the present invention with the power infeed at one port and the three remaining ports used for any combination of modular receptacles, jumpers to carry power to other modular electrical components in the system, lighting appliances, other electrical devices and/or unused for reserve or expansion capacity.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
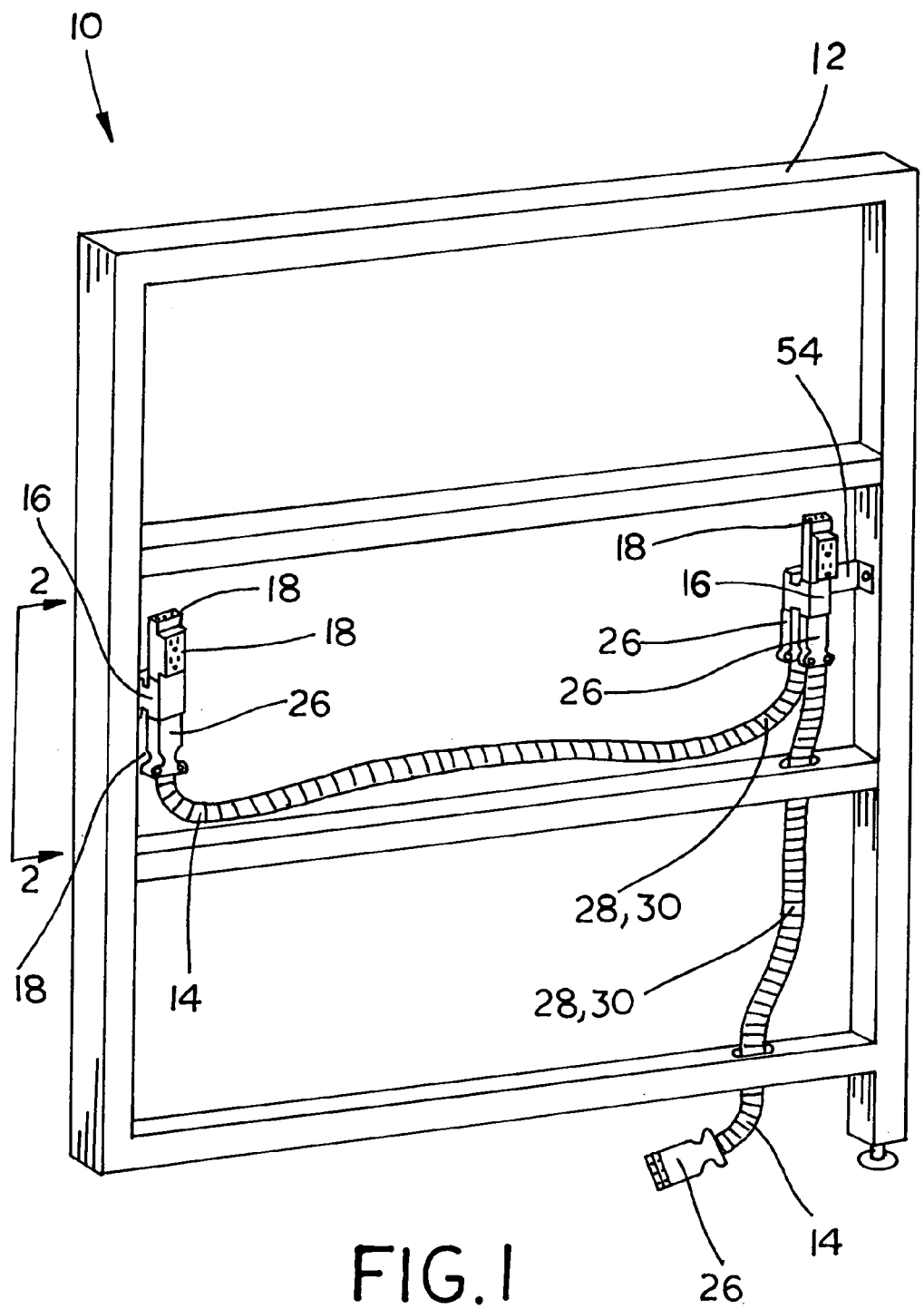
FIG. 1 is a perspective view of an embodiment the modular wall panel assembly of the present invention.

Referring now to the drawings, and more particularly to FIG. 1, there is shown modular wall panel assembly 10 which generally includes modular wall panel 12, wiring harnesses 14, electrical connectors 16 and modular receptacles 18.

Modular wall panel 12 generally includes covers 20 (FIG. 2) which are not shown in FIG. 1 for illustration purposes. Covers 20 include cutouts 22 on opposite sides 24 allowing access to modular receptacles 18.

Wiring harness 14 is connected to modular wall panel 12. Wiring harness 14 includes end connectors 26 interconnected by cable 28 having a plurality of conductors 30 therein.

Figure 3:
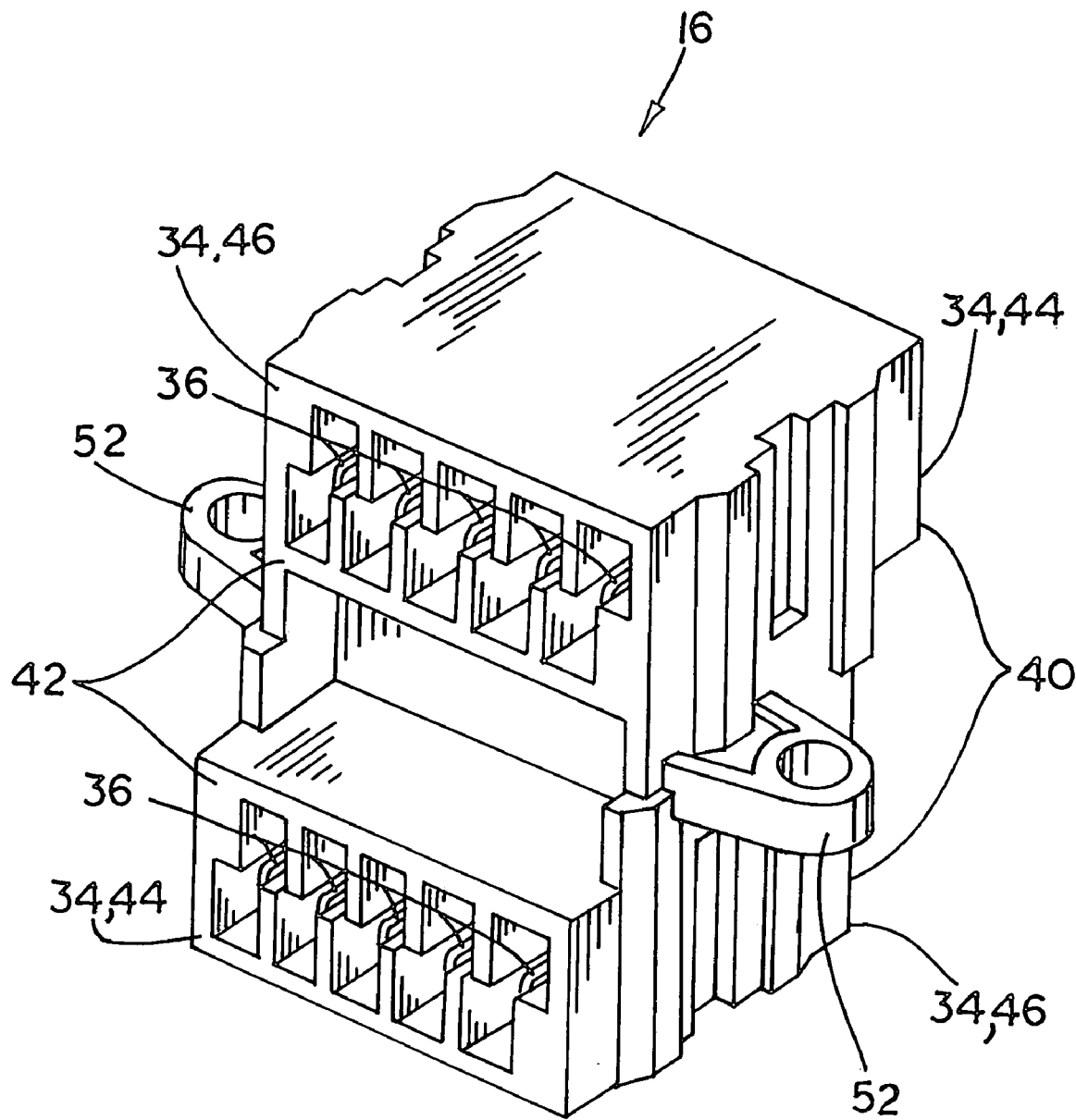
FIG. 3 is a perspective view of the electrical connector of the present invention.

Electrical connector 16 has a plurality of terminal ports 34 electrically interconnected by terminals 36. The present embodiment includes ten terminals 36 for each terminal port 34, although only five terminals 36 are seen in FIG. 3. Alternatively, electrical connector 16 can include more or less terminals 36 than is shown in the present embodiment. At least one transverse axis 38 separates the plurality of terminal ports 34. In the embodiment shown electrical connector 16 is separated into two pair 40, 42 of opposed terminal ports 34 which face opposite directions from transverse axis 38. Each pair 40, 42 has one terminal port 44 positioned further away from transverse axis 38 and another terminal port 46 positioned closer to transverse axis 38. Electrical connector 16 can be connected to a source of power (not shown) by connection to wiring harness 14 via conductors 30 and end connectors 26.

Figure 2:
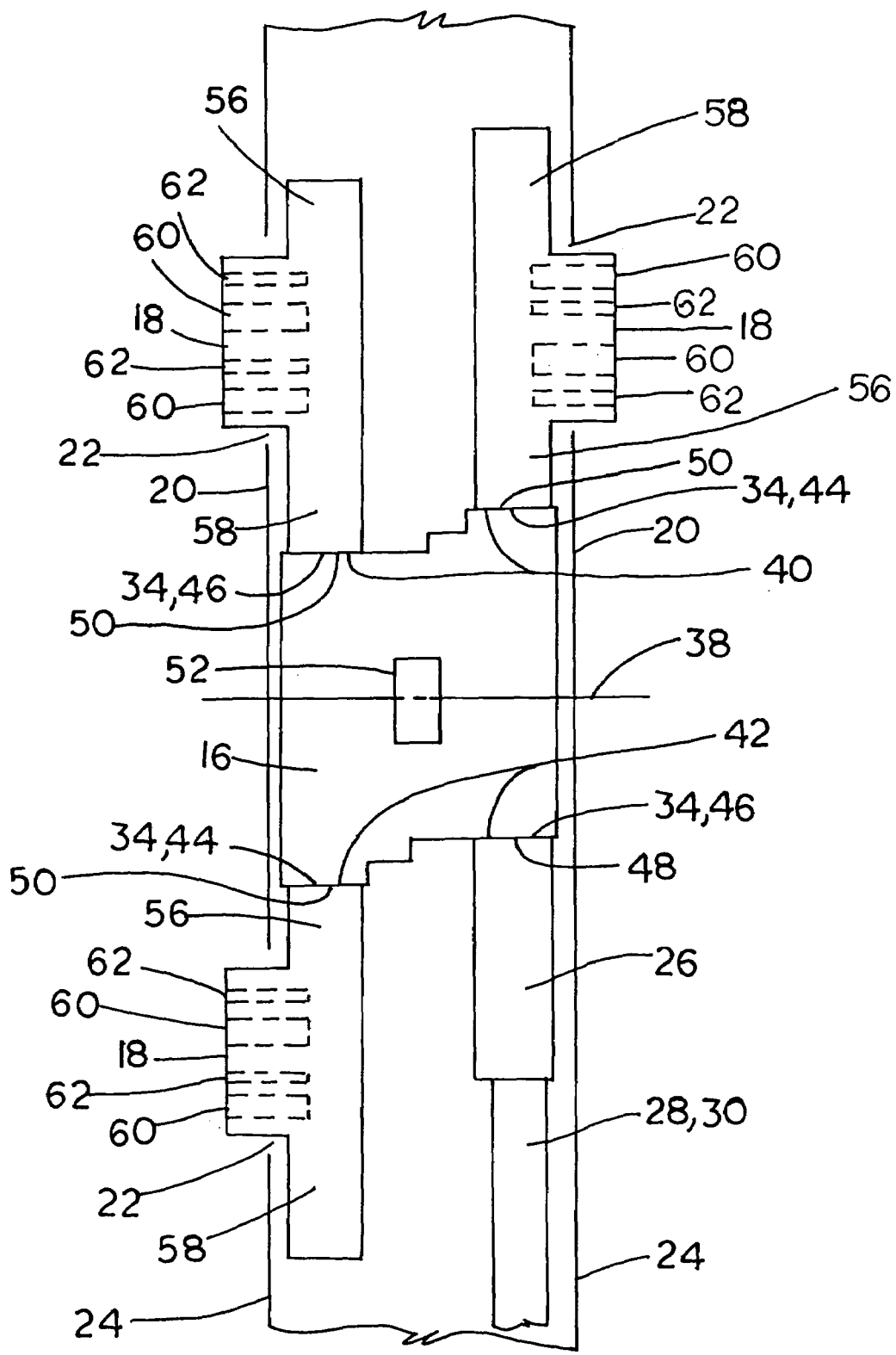
FIG. 2 is a side view of the electrical connector of the present invention shown connecting with receptacles and a wiring harness as viewed from section line 2—2 in FIG. 1.

Terminal ports 34 of electrical connector 16 can include one infeed 48 and three outfeeds 50 as shown particularly in FIG. 2. Infeed 48 is used to receive power and the device according to the present invention then distributes the power to the remaining terminal ports 34. Electrical connector 16 can include at least one attachment element 52. Attachment element 52 can be used to connect electrical connector 16 mechanically to modular wall panel 12 with, for example, bracket 54.

In use, modular receptacles 18 can have short segment 56 and long segment 58 thereby offsetting hot and neutral terminals 60 and ground terminals 62, in modular receptacle 18, in a longitudinal direction as shown. In order to maintain proper orientation of hot and neutral terminals 60 and ground terminals 62 in modular receptacles 18 relative to cutouts 22, and the correct spacing of modular receptacles 18, long segment 58 is connected to closer terminal port 46 and short segment 56 is connected to further terminal port 44. Alternatively, electrical connector 16 can be used with symmetrical duplex receptacles (not shown) by adjusting cutout 22 spacing (not shown). As shown in FIG. 1, terminal ports 34 can connect to both modular receptacles 18 and wiring harnesses 14 therefore making electrical connector 16 useful when expanding or reconfiguring an electrical system a in modular wall panel assembly.

Electrical connector 16 of the present invention is used in a plurality of electrical power applications, for example, modular office furniture (UL1286), training tables and moveable desks (UL962), underfloor circuits (UL183), in wall circuits (UL183) and overhead lighting (UL183).

Circuit configurations include 6 lines, 2 oversize neutrals and 2 grounds; and 4 lines, 4 nuetrals and 2 grounds, although other configurations are possible. Other utilities or signals such as communications, data, alarm and environmental controls can be interconnected using electrical electrical connector 16.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A modular wall panel assembly, comprising:
   a modular wall panel;
   a wiring harness connected to said modular wall panel, said wiring harness including a plurality of conductors; and
   an electrical connector connected to said plurality of conductors, said electrical connector having a first terminal port, a second terminal port, a third terminal port and a fourth terminal port, and a transverse axis, said first terminal port opposed said second terminal port relative to said transverse axis, said first terminal port in line with said second terminal port relative to a plane orthogonal with said transverse axis, said third terminal port opposed to said fourth terminal port relative to said transverse axis, said third terminal port in line with said fourth terminal port relative to a plane orthogonal with said transverse axis, both said first terminal port and said third terminal port on a same side of said electrical connector relative to said transverse axis, both said second terminal port and said fourth terminal port on an opposite side of said electrical connector relative to said transverse axis, both said first terminal port and said fourth terminal port being closer to said transverse axis than both said second terminal port and said third terminal port and thereby defining a staggered offset arrangement.

2. The modular wall panel assembly of claim 1, further including a plurality of terminals interconnecting said first terminal port, said second terminal port, said third terminal port and said fourth terminal port.

3. The modular wall panel assembly of claim 1, wherein said first terminal port, said second terminal port, said third terminal port and said fourth terminal port include one infeed and three outfeeds.

4. The modular wall panel assembly of claim 1, wherein said electrical connector includes at least one attachment element.

5. The modular wall panel assembly of claim 1, further including at least one modular receptacle connected to said electrical connector, each said modular receptacle having a faceplate offset in a longitudinal direction.

6. A modular wall panel assembly, comprising:
   a modular wall panel;
   a wiring harness connected to said modular wall panel, said wiring harness including a plurality of conductors; and
   an electrical connector connected to said plurality of conductors, said electrical connector having a plurality of terminal ports and a transverse axis, two pairs of opposed said terminal ports facing opposite directions from said transverse axis, each said pair having one terminal port positioned further away from said transverse axis and another said terminal port positioned closer to said transverse axis, further including at least one modular receptacle connected to said electrical connector, each said modular receptacle having a faceplate offset in a longitudinal direction, said modular wall panel including opposite sides and a plurality of cutouts, one said side having at least one said cutout aligned with at least one said cutout in an other said side, said at least one receptacle including two receptacles with oppositely offset faceplates received within respective said aligned cutouts.

7. An electrical connector for a modular wall panel assembly, comprising: first terminal port, a second terminal port, a third terminal port and a fourth terminal port, and a transverse axis, said first terminal port opposed said second terminal port relative to said transverse axis, said first terminal port in line with said second terminal port relative to a plane orthogonal with said transverse axis, said third terminal port opposed to said fourth terminal port relative to said transverse axis, said third terminal port in line with said fourth terminal port relative to a plane orthogonal with said transverse axis, both said first terminal port and said third terminal port on a same side of said electrical connector relative to said transverse axis, both said second terminal port and said fourth terminal port on an opposite side of said electrical connector relative to said transverse axis, both said first terminal port and said fourth terminal port being closer to said transverse axis than both said second terminal port and said third terminal port and thereby defining a staggered offset arrangement.

8. The electrical connector of claim 7, further including a plurality of terminals interconnecting said first terminal port, said second terminal port, said third terminal port and said fourth terminal port.

9. The electrical connector of claim 7, wherein said first terminal port, said second terminal port said third terminal port and said fourth terminal port include one infeed and three outfeeds.

10. The electrical connector of claim 7, wherein said electrical connector includes at least one attachment element.

11. A method of electrifying a modular wall panel, comprising the steps of:
   connecting a power infeed to an electrical connector, said electrical connector including a first terminal port, a second terminal port, a third terminal port and a fourth terminal port, and a transverse axis, said first terminal port opposed said second terminal port relative to said transverse axis, said first terminal port in line with said second terminal port relative to a plane orthogonal with said transverse axis, said third terminal port opposed to said fourth terminal port relative to said transverse axis, said third terminal port in line with said fourth terminal port relative to a plane orthogonal with said transverse axis, both said first terminal port and said third terminal port on a same side of said electrical connector relative to said transverse axis, both said second terminal port and said fourth terminal port on an opposite side of said electrical connector relative to said transverse axis, both said first terminal port and said fourth terminal port being closer to said transverse axis than both said second terminal port and said third terminal port and thereby defining a staggered offset arrangement; and
   distributing said electrical power to a first receptacle unit and a second receptacle unit, said first receptacle unit connected to said terminal port positioned further away from said transverse axis, said second receptacle unit connected to said another terminal port positioned closer to said transverse axis.

12. The method of claim 11, further including a plurality of terminals interconnecting said first terminal port, said second terminal port, said third terminal port and said fourth terminal port.

13. The method of claim 11, wherein said first terminal port, said second terminal port, said third terminal port and said fourth terminal port include one infeed and three outfeeds.

14. The method of claim 11, wherein said electrical connector includes at least one attachment element.

15. A method of electrifying a modular wall panel, comprising the steps of:
   connecting a power infeed to an electrical connector, said electrical connector including a plurality of terminal ports and a transverse axis, two pairs of opposed said terminal ports facing opposite directions from said transverse axis, each said pair having one terminal port positioned further away from said transverse axis and another said terminal port positioned closer to said transverse axis; and
   distributing said electrical power to a first receptacle unit and a second receptacle unit, said first receptacle unit connected to said terminal port positioned further away from said transverse axis, said second receptacle unit connected to said another terminal port positioned closer to said transverse axis, wherein each said receptacle has a faceplate offset in a longitudinal direction.

16. The method of claim 15, wherein said modular wall panel includes opposite sides and a plurality of cutouts, one said side having at least one said cutout aligned with at least one said cutout in an other said side, said at least one receptacle including two receptacles with oppositely offset faceplates received within respective said aligned cutouts.

* * * * *